(12) United States Patent
Johnson

(10) Patent No.: US 7,444,459 B2
(45) Date of Patent: Oct. 28, 2008

(54) METHODS AND SYSTEMS FOR LOAD BALANCING OF VIRTUAL MACHINES IN CLUSTERED PROCESSORS USING STORAGE RELATED LOAD INFORMATION

(75) Inventor: Stephen B. Johnson, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 136 days.

(21) Appl. No.: 11/609,408

(22) Filed: Dec. 12, 2006

(65) Prior Publication Data

US 2008/0141264 A1    Jun. 12, 2008

(51) Int. Cl.
*G06F 12/00* (2006.01)

(52) U.S. Cl. ............... 711/6; 711/154; 711/165; 718/105

(58) Field of Classification Search ...... 711/6, 711/154, 165; 718/105
See application file for complete search history.

(56) References Cited

U.S. PATENT DOCUMENTS

| | | | |
|---|---|---|---|
| 6,223,202 B1 * | 4/2001 | Bayeh | 718/102 |
| 7,080,378 B1 * | 7/2006 | Noland et al. | 718/104 |
| 7,203,944 B1 * | 4/2007 | van Rietschote et al. | 718/104 |

* cited by examiner

*Primary Examiner*—Stephen C Elmore
(74) *Attorney, Agent, or Firm*—Duft, Bornsen & Fishman, LLP

(57) ABSTRACT

Methods and systems for generating storage related load factor information for load balancing of multiple virtual machines operable in a cluster of multiple physical processors (such as a blade center). Load factor information is generated within a storage system relating to operation of the storage system as a whole and relating to each of multiple storage controllers in the storage system. The information so generated in the storage system is communicated to a load balancing element associated with the multiple virtual machines. The load balancing element then utilizes the storage related load factor information, optionally in combination with other load factor information, to distribute or redistribute the operation of the multiple virtual machines over the plurality of physical processors.

19 Claims, 4 Drawing Sheets

METHODS AND SYSTEMS FOR LOAD BALANCING OF VIRTUAL MACHINES IN CLUSTERED PROCESSORS USING STORAGE RELATED LOAD INFORMATION

BACKGROUND

1. Field of the Invention

The invention generally relates to the load balancing for multiple virtual machines operating in a clustered computing environment and more specifically relates to systems and methods for generating and utilizing storage system load information in load balancing of the multiple virtual machines as operable on a plurality of physical processors of a cluster such as a so-called "blade center".

2. Discussion of Related Art

It is generally known in the computing industry to provide a virtual machine environment operating "atop" a physical computing environment. A virtual machine environment, also referred to as a guest operating system, provides a layer of virtualization such that users and/or application programs may operate as though they are utilizing a dedicated physical processor with associated dedicated memory, storage, and I/O peripheral devices all under control of a virtualized operating system (the "guest" operating system). Hence, multiple such virtual machines may be simultaneously (and/or concurrently) operating on a single computing environment such that multiple users and/or application programs may simultaneously/concurrently operate as though each is using a dedicated physical computing environment. Such virtual machine computing technology has been well known in the computing arts for some time including, for example, the IBM MVS (multiple virtual systems) computing environment and including more recent examples such as the VMware family of virtual machine software components.

As noted above, the principle benefit of operating a virtual machine on top of a physical computing environment is to permit multiple such virtual machines to be simultaneously/concurrently operable on a single physical computing environment. Each virtual machine is operable on behalf of a corresponding set of users and/or a corresponding set of application programs. In addition, as clustered computing has evolved such that a plurality of physical processors are tightly coupled in a "cluster", virtual machine computing techniques have adapted to allow utilization of the plurality of processors in such a cluster. In particular, a plurality of virtual machine computing environments may be concurrently/simultaneously operable and distributed over a plurality of physical processors configured in a clustered computing environment. As used herein, clustered computing should be broadly understood to include not only tightly coupled physical processors communicating through short distance bus structures but also includes more widely distributed network computing where a plurality of processors are logically coupled as a "cluster" utilizing well-known computer network communication protocols and media. In particular, as used herein, a "cluster" includes configuration commonly referred to as a "blade center" in which multiple servers (each including fully operational processor/processors and memory under control of an operating system) are tightly coupled through a shared fabric and/or through a common backplane/mid-plane bus architecture. Thus, a cluster may represent a tightly coupled plurality of physical processors and/or processor/memory complexes in close physical proximity sharing short distance bus structures or fabric connections for inter-process communication and may include a wider physical distribution coupling a plurality of processors utilizing computer networking protocols. Further, as used herein, the "plurality of processors" is intended to refer to a processor/memory complex such as a blade as distinct from a single processor of a blade or complex that has multiple processors on a single blade/complex. In other words, each "processor" of a "plurality of processors" as used herein includes a processor/memory complex generally under the control of a single operating system.

In such a cluster computing environment operating multiple virtual machines, it is generally known to provide a load balancing method and/or component within the clustered environment to permit dynamic distribution and redistribution of the multiple virtual machines (i.e., guest operating systems) over different ones of the plurality of processors. In other words, where one of the physical processors (e.g., one blade or complex) is overloaded with computational requirements and/or memory requirements for multiple virtual machines operating thereon, one or more of the virtual machines operable on the overloaded blade/complex may be redistributed to one or more less heavily loaded physical processors. Thus, the load balancing component or method of the clustered environment identifies is responsible for appropriately distributing or redistributing virtual machine environments to different processors (e.g., different blades or complexes) of the plurality of physical processors in the clustered environment to avoid or alleviate possible overloading of a blade/complex of the cluster.

Present load balancing systems and techniques associated with multiple virtual machines operating in a clustered computing environment account only for load factor information derived from the clustered computing physical processors, per se. In other words, current load balancing systems and techniques may determine that a particular CPU or memory of a physical processor may be computationally overloaded by the operation of multiple virtual machines on the associated physical processor. However, it is generally a problem that such load factor information fails to account for other aspects of loading imposed by virtual machine operation. In particular, present load balancing techniques for multiple virtual machines operating in a clustered computing environment fail to account for load factor information associated with attached storage systems. Frequently, in clustered computing environments, the multiple physical processors share access to a storage system. The storage system may include multiple storage controllers all coupled to a plurality of storage devices for providing I/O request processing on behalf of attached physical processors including, for example, storage management techniques such as RAID storage management. Frequently, multiple virtual machines may not significantly overload the CPU or main memory of any particular physical processor. However, the multiple virtual machines may create a bottleneck for overall performance of the clustered system by sharing common interface structures coupling the physical processor to a particular storage controller of the storage system. Thus, current load balancing techniques are generally incapable of detecting such load balancing bottlenecks and thus are incapable of remediation of such bottlenecks through redistribution of one or more virtual machines to other physical processors.

Is evident from the above discussion that a need exists for improved systems and methods for load balancing of multiple virtual machines operating in a clustered computing environment.

SUMMARY

The present invention solves the above and other problems, thereby advancing the state of the useful arts, by providing systems and methods for generating storage system related load factor information and utilizing such information in load balancing techniques applied to redistribute the load of multiple virtual machines operating in a clustered computer environment.

A first feature hereof therefore provides a system that includes a cluster of physical processors wherein each of the physical processors is communicatively coupled to each other physical processor of the cluster. The system also includes a plurality of virtual machines wherein each virtual machine is operable on any subset of the physical processors and wherein the plurality of virtual machines are distributed to operate over a plurality of the physical processors. Further, the system includes a load balancer, communicatively coupled to the plurality of physical processors, the load balancer adapted to redistribute a virtual machine from a first subset of the physical processors to a different subset of the physical processors based on load factor information. Lastly, the system includes a storage system having a plurality of storage controllers. The storage system is coupled to the physical processors and includes a storage load factor information generator adapted to generate storage system load factor information relating to the storage controllers of the storage system. The load factor information generator is communicatively coupled to the load balancer to apply the storage system load factor information to the load balancer for use therein to redistribute the virtual machine.

Another feature hereof provides a method for balancing load of multiple virtual machines operating in a cluster of physical processors coupled to a storage system. The method includes generating storage load factor information within the storage system regarding loading of a plurality of storage controller in the storage system. The method also includes communicating the storage load factor information to a load balancer associated with the plurality of physical processors. The method lastly includes redistributing one or more of the multiple virtual machines to operate on different physical processors of the cluster to balance the load on the physical processors associated with use of the storage controllers.

Still another feature hereof provides a load balancing apparatus for a plurality of virtual machines. The apparatus and virtual machines are operable in a system having a blade center coupled to a storage system through a switched fabric connection. The blade center includes a plurality of processor/memory complexes and the storage system comprising a plurality of storage controllers. The load balancing apparatus includes a storage system load factor information generator operable within the storage system to generate storage load factor information relating to one or more of the plurality of storage controllers. The apparatus also includes a load balancer operable in the blade center and communicatively coupled to the storage system load factor information generator. The load balancer is adapted to receive the storage load factor information from the generator and is further adapted to utilize the storage load factor information in distributing operation of one or more of the plurality of virtual machines over the plurality of processor/memory complexes of the blade center.

DETAILED DESCRIPTION OF THE DRAWINGS

Figure 1:
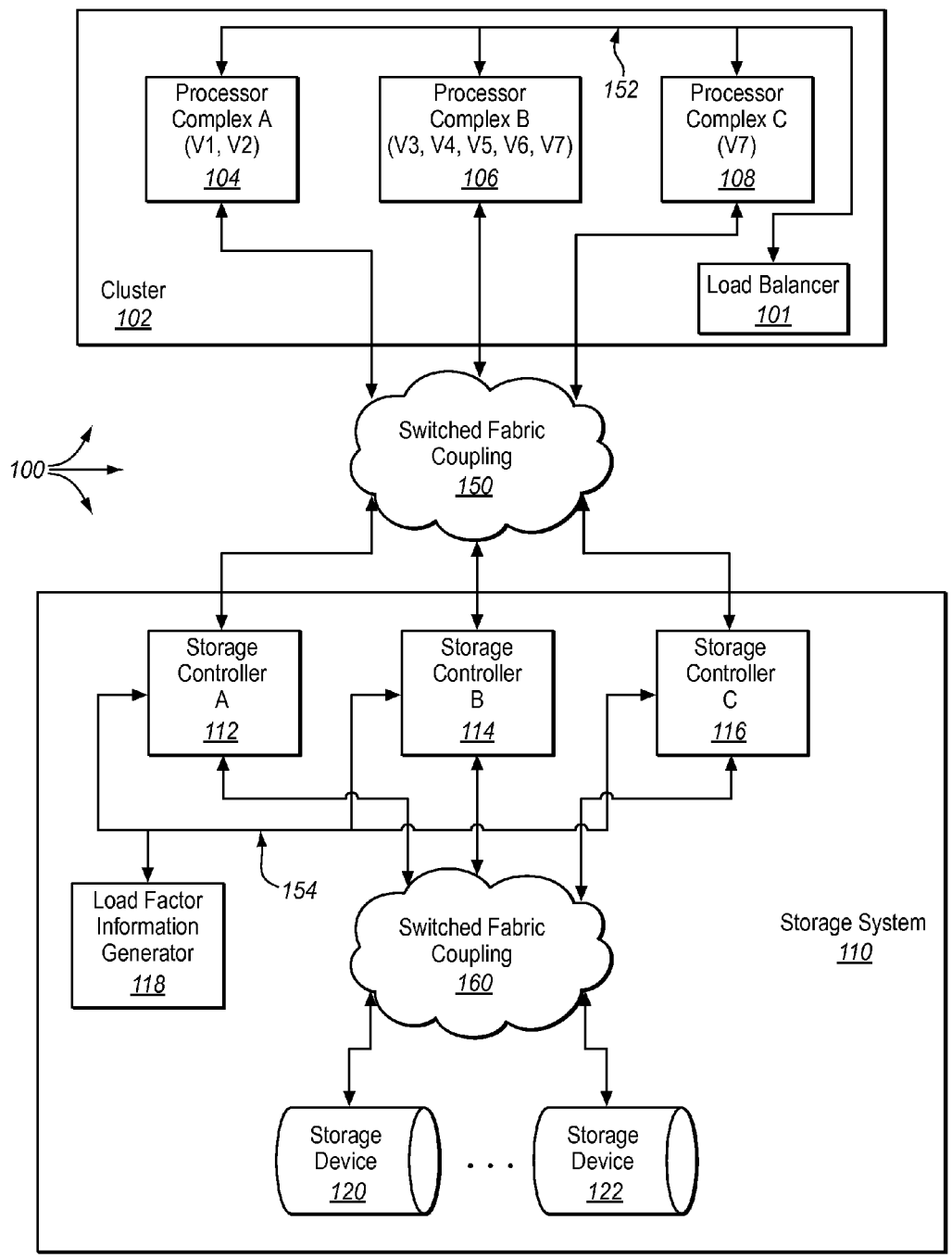
FIG. 1 is a block diagram of an exemplary system enhanced in accordance with features and aspects hereof to generate and communicate storage related load factor information to a load balancer associated with multiple virtual machines operating on a plurality of physical processors.

FIG. 1 is block diagram of an exemplary system 100 embodying features and aspects hereof to generate and utilize storage related load factor information within system 100. System 100 may include clustered computing environment 102 comprising a plurality of physical processors: processor A 104, processor B 106, and processor C 108. As is generally known in the art, such a clustered environment may include a backplane or mid-plane interconnect 152 (or other suitable interconnect structures) for coupling the multiple processors. Examples of such interconnects 152 include various PCI bus structures, AMB/AHB bus structures, and a variety of high speed serial interconnect structures and protocols to allow the various processors 104 through 108 to communicate with one another.

Multiple virtual machines may operate on the processors of the cluster 102. Further, the multiple virtual machines may be distributed over one or more of the plurality of physical processors in cluster 102. For example, processor A 104 indicates that virtual machine V1 and virtual machine V2 are presently operable thereon. Processor B 106 indicates that virtual machines V3 through V7 are operable utilizing that processor. In like manner, processor C 108 indicates that it is also utilized by virtual machine V7 (e.g., V7 is distributed over two processors 106 and 108).

System 100 also includes load balancer 101 communicatively coupled with the plurality of physical processors 104 through 108 through interconnect 152 to help equalize or balance the load of the virtual machines operating on the plurality of physical processors. Load balancer 101 of cluster 102 is depicted in FIG. 1, by way of example, as a separate entity distinct from the various processors 104 through 108 of the cluster 102. Those of ordinary skill in the art will readily recognize that load balancer 101 may be implemented as such a separate, distinct processing element within the cluster 102 or may be integrated within a particular processor of the cluster, or may be distributed as cooperative communicating processes residing in each of the plurality of the physical processors. Such design choices are well known to those of ordinary skill in the art.

As noted above, presently practiced load balancing techniques and structures generally account only for utilization metrics associated with and determinable by each particular processor. For example, presently known load balancing techniques tend to account only for CPU utilization of a particular physical processor, memory utilization of that particular processor, I/O request rate generated by the processor, etc. (i.e., metrics determined by each processor for that processor) As presently practiced, load balancing techniques for virtual machines operable on a plurality of physical processors do not take account of shared access to common storage devices such as storage system 110 where multiple storage controllers 112 through 116 may be available for operation. For example, present load balancing techniques may fail to realize that the several virtual machines operable on one or more of the physical processors 104 through 108 are sharing access to only one of the plurality of storage controllers 112 through 116 of the common storage system 110. If that particular shared storage controller is overloaded, the corresponding virtual machines sharing access to that storage controller may be performing less than optimally. It may be possible, for example, to move a virtual machine to a different processor of the cluster 102 to permit one or more of the virtual machines sharing access to a particular storage controller to interact with a different storage controller of the multiple storage controllers 112 for 116 a storage system 110. However, present load balancing techniques and structures do not allow for such load balancing and, in fact, are generally devoid of useful information regarding load factors related to the storage system operation to make such determinations.

In accordance with features and aspects hereof, storage system 110 includes load factor information generator element 118 operable to analyze operation of the storage system 110 as a whole and operation of the multiple storage controllers 112 through 116 of the storage system 110. Generator 118 may then generate load factor information relating to the performance of the various storage controllers 112 through 116 and of the system 110 as a whole. Such load factor information generated by element 118 is then communicated to load balancer 101 operable in cluster 102 to permit the load balancer 101 to consider storage controller and storage system load factor information when deciding how to distribute or redistribute the load of multiple virtual machines operating on the plurality of physical processors 104 through 108 of cluster 102.

As is generally known in the art, the plurality of physical processors 104 through 108 of cluster 102 may communicate through switched fabric coupling 150 to the various storage controllers 112 through 116 of storage system 110. Such a switched fabric may be implemented as a serial attached SCSI ("SAS") switched fabric, a Fibre Channel switched fabric, or any of other several other well-known, commercially available computer and/or storage networking structures and protocols. Load factor information generator 118 is generally communicatively coupled to each of the storage controllers 112 through 116 to gather storage related load factor information and to communicate such information, via a storage controller and switched fabric 150 to load balancer 101 within cluster 102.

Communication paths 154 generally represents any suitable inter-controller communication structure and protocol to allow load factor information generator 118 to gather information from each of the storage controllers 112 through 116 of storage system 110. Paths 154 also permit load factor information generator 118 to communicate the generated information to the cluster 102 (specifically to load balancer 101) through one or more of storage controllers 112 through 116, via fabric 150, through one or more processors 104 through 108. More specifically, load factor information generator 118 may represent any suitable structure and/or inter-process communication technique for gathering information from the storage controllers 112 through 116 and for formatting such gathered information as load factor information to be sent to load balancer 101. Thus generator 118 may be a component in storage system 110 separate and distinct from the plurality of storage controllers 112 through 116 or may be integrated and operable within one or more of the storage controllers.

Storage controllers 112 through 116 of storage system 110 may also communicate with the plurality of storage devices 120 through 122 of storage system 110 through a switched fabric coupling 160. As above, serial attached SCSI (SAS), parallel SCSI, Fibre Channel, and other well-known, commercially available communication structures and protocols may be used for coupling each of the storage controllers 112 through 116 to each of the storage devices 120 and 122. Inter-controller communication channel 154 may also be implemented simply as controller to controller communications through the switched fabric coupling 160. Preferably, a separate and distinct communication channel 154 couples the various storage controllers 112 for 116 and generator 118 for purposes of inter-controller communication leaving the full bandwidth of switched fabric coupling 160 available for exchanging data between the storage controllers 112 through 116 and the storage devices 120 and 122.

As exemplified in FIG. 1, a switched fabric 150 coupling the various components of system 100 allows, for example, any of the plurality of processors (104 through 108) to be controllably coupled to any of the plurality of storage controllers (112 through 116) within storage system 110. Use of serial attached SCSI ("SAS") is exemplary of a common design choice applying present technology. However, those of ordinary skill in the art will readily recognize a variety of other switched fabric connectivity architectures utilizing commercially available products to permit such flexible connectivity. In addition, features and aspects hereof may also be implemented where connectivity between the processors and storage controllers is not switched but rather is statically determined by an operator's configuration and installation. Thus, features and aspects hereof, though not shown in FIG. 1, may also be applied in systems devoid of switched fabric connectivity between the processors and the storage controllers. In such a case, load factor information as discussed further herein may be communicated to a particular one of the plurality of processors from a corresponding particular one of the storage controllers statically coupled thereto. Utilization of the storage related load factor information by the receiving processor may then entail first sharing the information with other processors and/or with the load balancer element 101 so that one or more virtual machines operable on the various processors may be redistributed to better balance the load on all of the plurality of processors.

As noted above and as discussed further herein below, the generated load factor information relating to operation of the storage controllers 112 through 116 of a storage system 110 may be communicated from generator 118 within storage system 110 to load balancer 101 in cluster 102 by any of several techniques. For example, load factor information relating to the storage system 110 may be generated asynchronously with respect to any I/O operations—e.g., either periodically generated or generated in response to detecting particular changes—and forwarded through a storage controller 112 for 116 via switched fabric coupling 150 to load balancer 101 through any of processors 104 through 108. Thus, load balancer 101 may include a specialized management application running on one or more of the plurality of physical processors 104 through 108 and adapted to receive such periodic or intermittent transmissions reflecting current loading information of the storage system 110. In addition, operation of the load factor information generator 118 may be tightly integrated with I/O processing within each of the storage controllers 112 through 116 of storage system 110. Thus, current load factor information pertaining to the operation of the storage system 110 as well as each controller therein (112 through 116) may be provided as part of returned status information associated with processing of I/O requests from cluster 102. Such load factor information pertaining to storage system 110 may then be retrieved from the returned status information by load balancer 101 through cooperative integration with the plurality of physical processors 104 through 108 and the virtual machines operable thereon. Regardless of the manner in which load factor information generated within storage system 110 is returned to cluster 102, load balancer 101 is operable to utilize such load factor information relating to the storage system 110 in distributing and/or redistributing the load of multiple virtual machines operable on the plurality of physical processors of cluster 102.

Those of ordinary skill in the art will readily recognize numerous equivalent and additional elements beyond those depicted in FIG. 1 for a fully functional system 100, cluster 102 or storage system 110. Thus, FIG. 1 is intended merely as exemplary of features and aspects hereof as implemented in a cluster computing environment to distribute or redistribute the load of multiple virtual machines (or other applications) over a plurality of processors in a cluster based upon load factor information pertaining to multiple storage controllers within a storage system coupled to the cluster. Such additional features are omitted in FIG. 1 merely for simplicity and brevity of this discussion.

Figure 2:
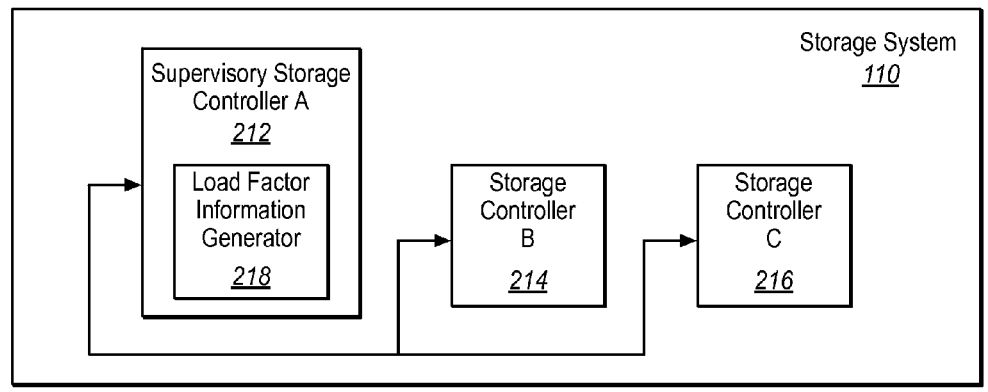
FIGS. 2 and 3 are block diagrams describing exemplary embodiments of the storage related load factor information generator integrated within one or more storage controllers of a system as in FIG. 1 in accordance with features and aspects hereof.

As shown in FIG. 1, load factor information generator 118 is depicted as separate and distinct with respect to the plurality of storage controllers 112 through 116 within the storage system 110. But the as noted above, the load factor information generation function may also be tightly integrated within the processing of the storage controllers. FIG. 2 therefore depicts an exemplary embodiment of a storage system 110 in which load factor information generator 218 is integrated within a designated supervisory storage controller 212 of the plurality of storage controllers (212 through 216). Other storage controllers 214 and 216 of storage system 110 are cooperatively operable with supervisory storage controller 212 to exchange load factor information with load factor information generator 218 operable within the supervisory storage controller 212.

Figure 3:
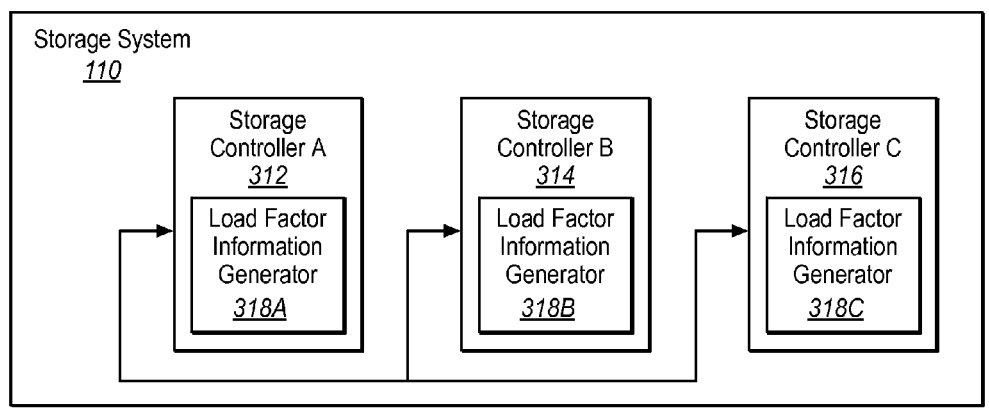

In like manner, FIG. 3 shows another exemplary embodiment wherein load factor information generation is distributed through each of the plurality of storage controllers. Storage system 310 of FIG. 3 therefore depicts three storage controllers 312 through 316 each of which has a corresponding integrated load factor information generator component 318(A), 318(B), and 318(C), respectively.

In FIGS. 2 and 3, the plurality of storage controllers 212 through 216 and 312 through 316 may communicate utilizing any of several well-known, commercially available, inter-controller communication media and protocols. Load factor information may thus be gathered by any one or more of the storage controllers pertaining to any or all of the plurality of storage controllers. Such inter-controller communication media and protocols may include, for example, InfiniBand, Fibre Channel, serial attached SCSI (SAS), PCI bus structures (including several variants of the PCI standards), etc. Those of ordinary skill in the art will therefore readily recognize a variety of equivalent structures whereby load factor information relating to the storage system as a whole and/or relating to each of the individual storage controllers within the storage system may be gathered and communicated to appropriate elements in an attached cluster computing environment. Further, those of ordinary skill in the art will readily recognize that numerous additional elements are typically present in a fully functional storage system 110. Such additional elements are eliminated from FIGS. 2 and 3 for simplicity and brevity of this discussion.

Figure 4:
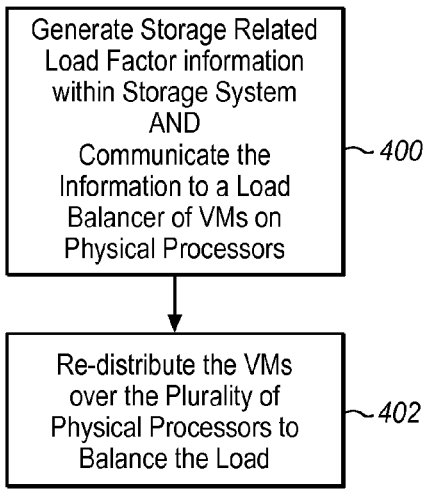
FIG. 4 is a flowchart describing an exemplary method in accordance with features and aspects hereof to generate storage related load factor information within a storage system and to communicate the generated information to a load balancer for utilization in balancing the load of multiple virtual machines operable on a plurality of physical processors.

FIG. 4 is a flowchart broadly describing a method in accordance with features and aspects hereof operable within the system such as that depicted and described above with respect to FIG. 1. Element 400 is first operable to generate storage related load factor information by any suitable means within the storage system. As noted above, a load factor information generator element may be operable within any or all of the storage controllers of the storage system or may be operable as a separate and distinct component relative to the storage controllers and coupled thereto. Such load factor information may include any number of aspects of operation of the related storage system and/or each of the storage controllers. For example, among the various types of load factor information relevant to operation of the storage system and/or storage controllers are:

the number of virtual machines presently communicating with each storage controller of the storage system;

the I/O request processing rate of any defined set of virtual machines coupled to any of the plurality of storage controllers;

the measured data throughput rate between any identified set of storage controllers and any set of virtual machines operable on the plurality of processors;

the number of queued or unprocessed I/O requests pending in any identified set of storage controllers;

the number of queued or unprocessed I/O requests generated from any identified set of virtual machines;

the maximum number of possible communication paths between any identified set of storage controllers and any identified set of virtual machines operable on the plurality of processors;

the total number of storage controllers presently coupled to any identified set of virtual machines; and the total number of physical processors.

Having generated such storage related load factor information by operation of a load factor generator element within the storage system, element 400 is also operable to effectuate communication of the generated load information to a load balancer element associated with the multiple virtual machines operable on the plurality of physical processors. The load balancer may then utilize the storage related load factor information (in conjunction with any other information useful for load balancing determinations) to redistribute virtual machines operable on the plurality of physical processors. By utilizing the storage related load factor information, the redistribution of virtual machines may better utilize the processing and communication bandwidth of the storage system as well as other aspects of physical processor utilization.

As noted above and as discussed further herein below, the communication of the generated storage related load factor information may utilize any of several techniques and structures. In addition, the generated information may be generated periodically to update the load balancer associated with the multiple virtual machines, may be intermittently generated based on detected events or changed conditions within the storage system, or may be generated and returned as part of the processing of I/O requests received and processed by the storage system from one or more virtual machines operable on the plurality of physical processors.

Element 402 of FIG. 4 therefore represents processing of the load balancer element associated with the multiple virtual machines to redistribute as necessary one or more of the multiple virtual machines over the plurality of physical processors. The redistribution, if any, helps achieve a better balance of the loading on the multiple physical processors and thus provides better overall performance of the multiple virtual machines.

Those of ordinary skill in the art will readily recognize numerous additional steps and exemplary detailed embodiments of processing of FIG. 4. Some exemplary embodiments of detailed processing are discussed further herein below with respect to FIGS. 5 through 7. Other embodiments and additional steps will be readily apparent to those of ordinary skill in the art and are omitted herein simply for brevity of this discussion.

Figure 5:
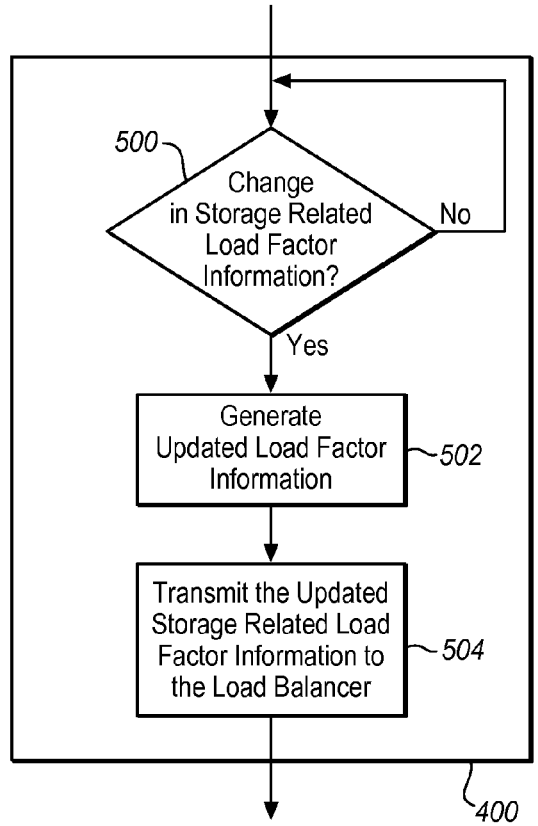

FIG. 5 is a flowchart providing exemplary detailed processing of element for hundred of FIG. 4 discussed above. In general, processing of FIG. 5 generates load factor information relating to the storage system only when a change in underlying status is detected within the storage system. Thus, load factor information is generated intermittently as required by detecting changes in the status of the storage system that may affect the load factor information (possibly including changes in the attached systems and virtual machines detected by the storage system). Element 500 therefore represents processing to determine whether any storage system status has changed since the last time load factor information was generated. If no significant change is detected, processing continues looping on element 500 until such time as a relevant change is detected. Upon detection of such a change in the storage system status, element 502 is then operable to generate updated load factor information reflecting the current status of load factor related information in the storage system. Element 504 is then operable to transmit the generated, updated load factor information to the load balancer element associated with the multiple virtual machines operating on the plurality of physical processors. Thus element 400 as detailed in FIG. 5 may be operable to generate and transmit load factor information from the storage system to the load balancer element upon detecting any significant change in the status of the storage system.

Figure 6:
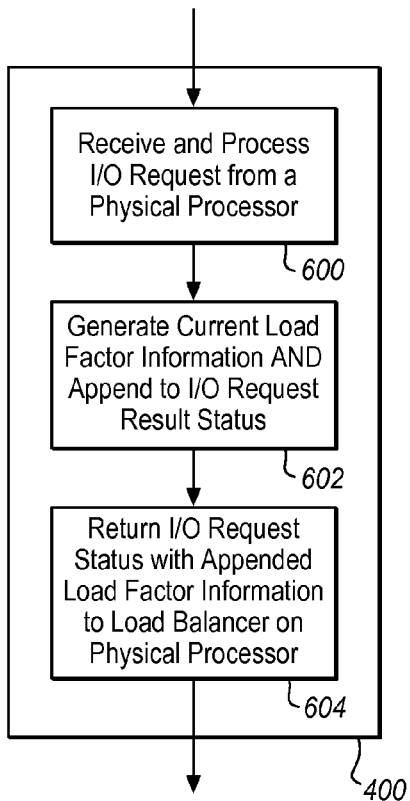
FIGS. 5 through 7 are flow charts providing exemplary additional details of embodiments of the method of FIG. 4 to generate and communicate the storage related load factor information for use in a load balancer for multiple virtual machines operable on a plurality of physical processors.

FIG. 6 is a flowchart providing exemplary detailed processing of element for hundred of FIG. 4 as discussed above. In general, the processing of FIG. 6 is operable to generate and return current load factor information in response to receipt and processing of an I/O request by the storage system received from a virtual machine and/or physical processor. In particular, element 600 represents receipt and normal processing of an I/O request within the storage system. Such an I/O request received from one or more of the physical processors on which one or more virtual machines is operable may represent the typical read or write request to retrieve or store information in the storage system. Such normal processing stores or retrieves requested data and typically generates a status response to be returned to the requesting virtual machine and/or physical processor from which the request originated. Element 602 then is operable to generate current load factor information relating to the storage system and/or storage controllers of the storage system. The generated information may be appended or integrated with the result/status information generated by processing of the I/O request as represented in element 600. For example, the returned/status information for a completed I/O request often includes bit fields and/or values indicating successful completion codes and error completion codes. A bit or value in such status completion information may be encoded to represent to the physical processor and/or virtual machine that current storage related load factor information has been appended or integrated with the returned status codes for the I/O operation. Lastly, element 604 is operable to transmit the I/O request status information along with the appended/integrated load factor information such that the load balancer element associated with the requesting physical processor may include the storage related load factor information in its load balancing determinations. Thus element 400 as shown in FIG. 6 may be operable to generate and transmit load factor information from the storage system to the load balancer element upon processing of an I/O request directed to the storage system from any of the multiple virtual machines operable on any of the plurality of physical processors in the attached cluster.

Figure 7:
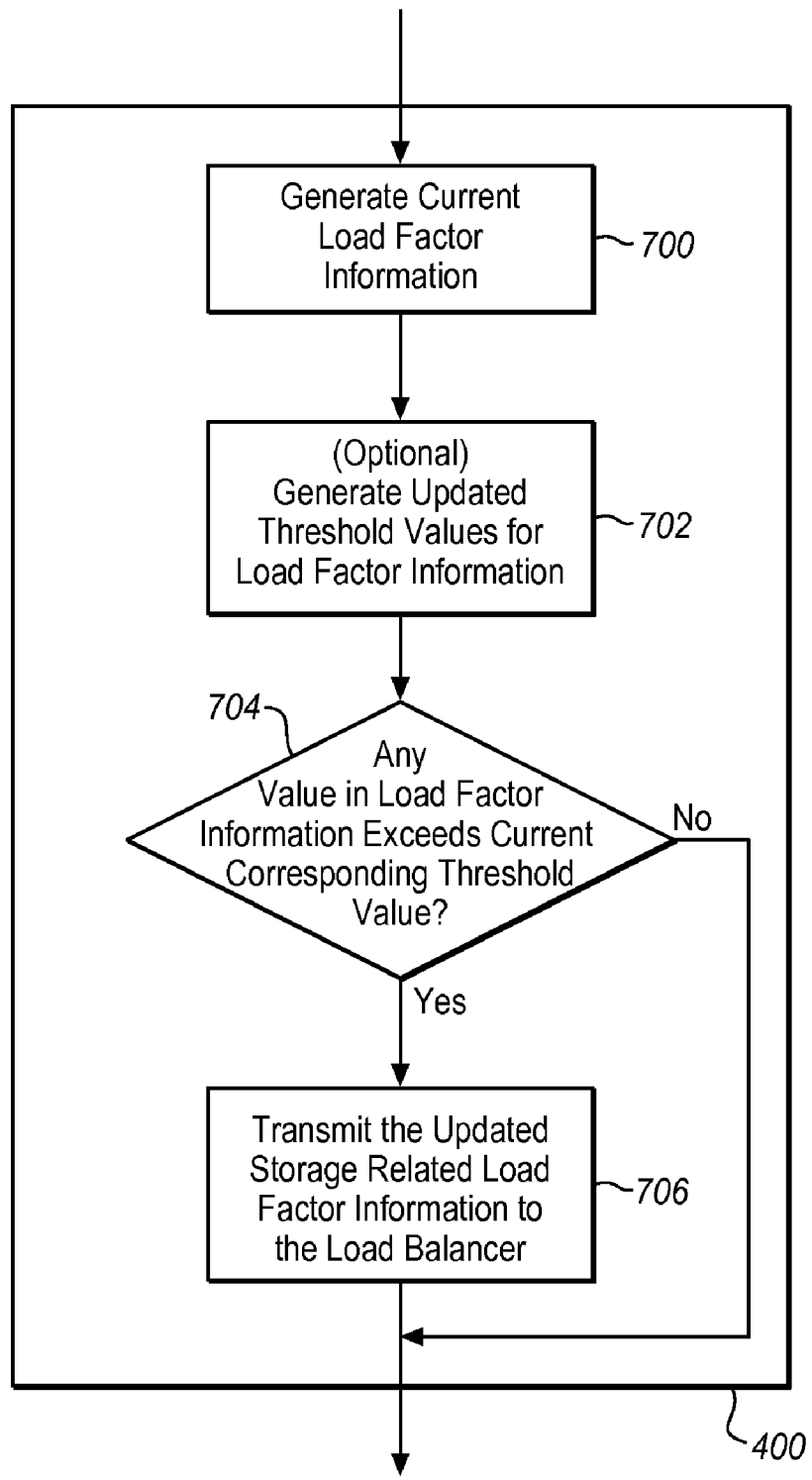

FIG. 7 is a flowchart providing exemplary details of the processing of element 400 of FIG. 4. In general, processing of FIG. 7 is operable to generate and transmit storage related load factor information when values of the load factor information fall outside a range of associated threshold values. Element 700 is therefore first operable to generate current load factor information. This operation may be performed periodically or intermittently based on detection of various particular events. Element 702 then represents optional processing to generate current updated threshold values for comparison against values in the load factor information. As noted above, the threshold values may be determined statically at time of manufacture of the storage system or as a configuration step in the storage system setup and installation or may be determined dynamically based upon changing operation of the storage system. Element 704 is then operable to utilize current threshold information (whether previously statically generated or currently updated by processing of element 702) to determine whether any value in the load factor information generated by element 700 falls outside the range defined by the corresponding threshold values. If not, processing of element 400 is complete. Otherwise the current, updated, storage related load factor information is transmitted to the load balancer element associated with the multiple virtual machines and the plurality of physical processors in the attached cluster. Responsive to receipt of such information, the load balancer element may then choose to redistribute one or more of the multiple virtual machines to others of the plurality of physical processors. Thus, element 400 as detailed in FIG. 7 is operable to generate and transmit updated load factor information in response to detecting that any values in the load factor information have fallen outside the range of values defined by corresponding threshold values. Further, as noted, the threshold values may be statically determined or may be dynamically updated based upon current operations within the storage system. Exemplary threshold values may correspond to the exemplary values described above as representative of load factor information.

Those of ordinary skill in the art will readily recognize equivalent and additional steps that may be incorporated in the methods of FIGS. 4 through 7 in a fully functional implementation. Such additional features and steps are omitted herein for simplicity and brevity of this discussion. Further, those of ordinary skill in the art will recognize other detailed methods for implementing features of the methods above by combining features of the exemplary detailed methods. For example, load factor information may be generated only when certain values fall outside a defined threshold range and if so generated my then be returned with completion status of a completed I/O request. Numerous other equivalent steps and methods will be readily apparent to those of ordinary skill in the art.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

What is claimed is:

1. A system comprising:
a cluster of physical processors wherein each of the physical processors is communicatively coupled to each other physical processor of the cluster;
a plurality of virtual machines wherein each virtual machine is operable on any subset of the physical processors and wherein the plurality of virtual machines are distributed to operate over a plurality of the physical processors;
a load balancer, communicatively coupled to the plurality of physical processors, the load balancer adapted to redistribute a virtual machine from a first subset of the physical processors to a different subset of the physical processors based on load factor information; and
a storage system having a plurality of storage controllers, the storage system coupled to the physical processors, the storage system including a storage load factor information generator adapted to generate storage system load factor information relating to the storage controllers of the storage system, wherein the load factor information generator is communicatively coupled to the load balancer to apply the storage system load factor information to the load balancer for use therein to redistribute the virtual machine.

2. The system of claim 1 wherein each physical processor is coupled to a corresponding subset of the plurality of storage controllers of the storage system.

3. The system of claim 1 wherein each physical processor may be coupled to any of the plurality of storage controllers of the storage system.

4. The system of claim 3 wherein the physical processors are coupled to the storage controllers through a switched fabric.

5. The system of claim 3 wherein the physical processors are coupled to the storage controllers through a switched serial attached SCSI ("SAS") network.

6. The system of claim 1 wherein the plurality of storage controllers are coupled to one another and one storage controller is designated as the supervisory controller, wherein the storage load factor information generator is operable in the supervisory controller to generate storage load factor information relating to each of the plurality of controllers.

7. The system of claim 1 wherein the storage system further comprises a plurality of storage load factor information generators each operable within a corresponding controller of the plurality of storage controllers to generate storage load factor information for the corresponding controller.

8. A method for balancing load of multiple virtual machines operating in a cluster of physical processors coupled to a storage system, the method comprising:
generating storage load factor information within the storage system regarding loading of a plurality of storage controller in the storage system;
communicating the storage load factor information to a load balancer associated with the plurality of physical processors; and
redistributing one or more of the multiple virtual machines to operate on different physical processors of the cluster to balance the load on the physical processors associated with use of the storage controllers.

9. The method of claim 8 wherein the step of generating further comprises:
generating the storage load factor information to update the load balancer responsive to sensing changes in the load factor information.

10. The method of claim 8 wherein the step of generating further comprises:
generating the storage load factor information as part of returned status information for processing of an I/O request, and
wherein the step of communicating further comprises:
returning the generated storage load factor information as status information in response to a completed I/O request.

11. The method of claim 8 further comprising:
providing one or more threshold values relating to information in the storage load factor information,
wherein the step of communicating further comprises:
communicating the storage load factor information to the load balancer when a value in the storage load factor information exceeds a corresponding threshold value.

12. The method of claim 11 wherein the step of providing further comprises:
dynamically updating the one or more threshold values.

13. The method of claim 11 wherein the step of providing further comprises:
providing one or more threshold values derived from one or more measures selected from the group consisting of:
number of active virtual machines presently communicating with each of the storage controllers;
I/O request processing rate of any set of the virtual machines;
data throughput between a controller and any set of virtual machines;
number of unprocessed I/O requests in a storage controller;
number of unprocessed I/O requests from a set of virtual machines;
number of possible communication paths between any set of storage controllers and any set of virtual machines;
total number of storage controllers connected to any set of virtual machines; and
number of physical processors.

14. Load balancing apparatus for a plurality of virtual machines operable in a system having a blade center coupled to a storage system through a switched fabric connection, the blade center comprising a plurality of processor/memory complexes, the storage system comprising a plurality of storage controllers, the load balancing apparatus comprising:
a storage system load factor information generator operable within the storage system to generate storage load factor information relating to one or more of the plurality of storage controllers; and
a load balancer operable in the blade center and communicatively coupled to the storage system load factor information generator, the load balancer adapted to receive the storage load factor information from the generator, and the load balancer adapted to utilize the storage load factor information in distributing operation of one or more of the plurality of virtual machines over the plurality of processor/memory complexes of the blade center.

15. The apparatus of claim 14 wherein the generator is adapted to generate the storage load factor information responsive to sensing changes in the load factor information.

16. The apparatus of claim 14 wherein the generator is adapted to generate the storage load factor information as part of returned status information for processing of an I/O request by a storage controller, and is adapted to communicate the storage load factor information as status information in response to a completed I/O request.

17. The apparatus of claim 14 wherein the generator further comprises:
a threshold value relating to information in the storage load factor information,
wherein the generator is further adapted to communicate the storage load factor information to the load balancer when a value in the storage load factor information exceeds the threshold value.

18. The apparatus of claim 17 wherein the generator is further adapted to dynamically update the threshold values.

19. The apparatus of claim 17 wherein the threshold value is derived from one or more measures selected from the group consisting of:
number of active virtual machines presently communicating with each of the storage controllers;
I/O request processing rate of any set of the virtual machines;
data throughput between a controller and any set of virtual machines;
number of unprocessed I/O requests in a storage controller;
number of unprocessed I/O requests from a set of virtual machines;
number of possible communication paths between any set of storage controllers and any set of virtual machines;
total number of storage controllers connected to any set of virtual machines; and
number of physical processors.

* * * * *